Oct. 5, 1965
W. HOLZER
3,210,574
DEVICE FOR A STEPWISE SWITCHING ACTION
OF A PROGRAM SWITCHING
Filed Nov. 6, 1961
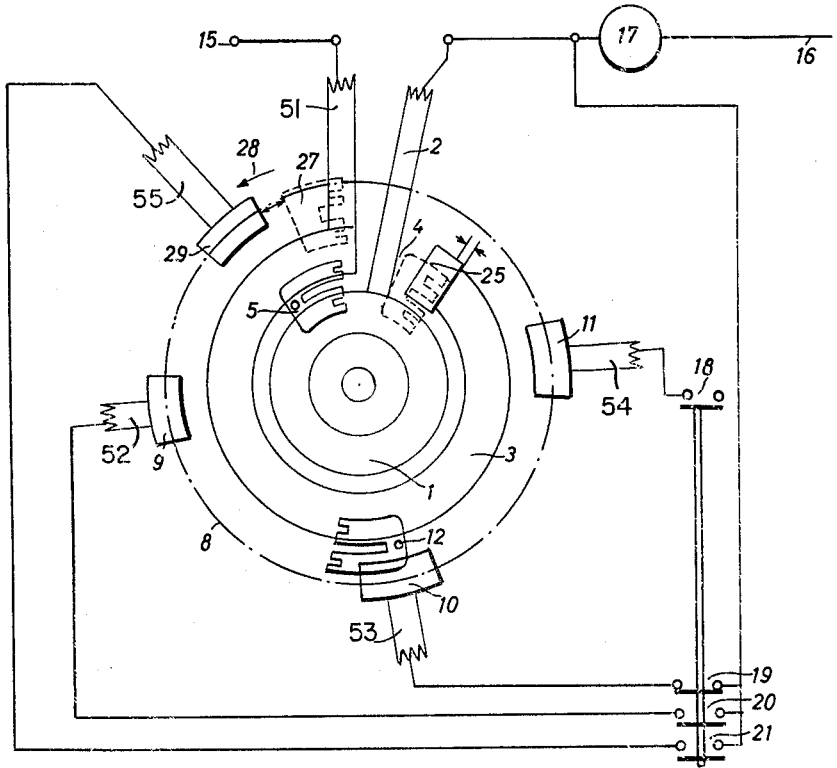
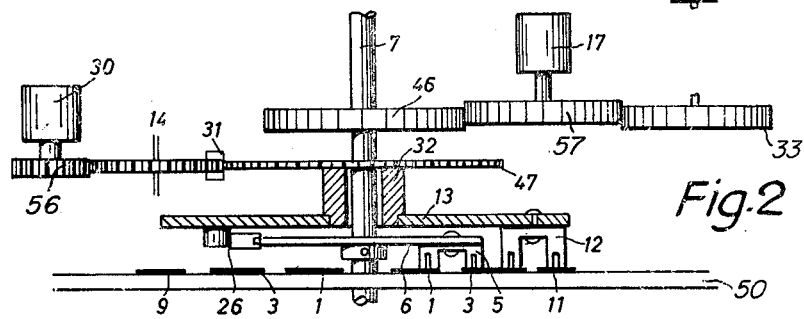
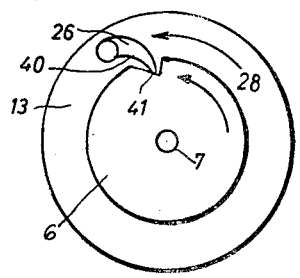
INVENTOR:
WALTER HOLZER
By Toulmin & Toulmin
Attorneys

United States Patent Office 3,210,574
Patented Oct. 5, 1965

3,210,574
DEVICE FOR A STEPWISE SWITCHING ACTION
OF A PROGRAM SWITCHING
Walter Holzer, Schutzenrain, Meersburg (Bodensee),
Baden, Germany
Filed Nov. 6, 1961, Ser. No. 150,440
Claims priority, application Germany, Nov. 7, 1960,
40,877
7 Claims. (Cl. 307—141)

This invention relates to an electric control device of the kind in which a timing means is used to actuate a stepping mechanism. Such an arrangement can be used, for example, in a laundering machine, in which the stepping mechanism controls function to be performed and the timer determines the duration of at least some of those functions.

The invention has for its object to provide an apparatus of this kind in which the parts have improved arrangement by which they can home to their initial positions.

The invention consists broadly of an electrical control means for stepping a programme means by a timer at selectable time intervals, and comprises a plurality of tracks the first being continuous, a second being interrupted, and the third having discrete parts the spacings between which correspond to the selectable time intervals. The second track is scanned by two wiper contacts one of which is moved by the timer drive and provides an electrical connection to the third track, while the second wiper contact is moved by the stepping mechanism drive and provides an electrical connection to the first track; an overrun coupling between the contacts enables the normally timer-moved contact to be driven by the stepping-mechanism-moved contact until the same reaches the interruption in the second track and therefore stops its drive.

In one embodiment of the invention there are provided three contact tracks; a first track comprises a closed annulus, the second track is disposed concentrically thereto and is interrupted, and the third track is formed by individual isolated segments concentrically disposed with respect to the two other tracks. The spacings between those segments correspond to the selectable time intervals. The second track is scanned by two wiper contacts, one of which is moved by the timer drive and provides an electrical connection to the third track, while the second wiper contact is moved by the stepping mechanism drive and provides an electrical connection to the first track. An overrun coupling is provided between the two wiper contacts enabling the timer-moved wiper contact to be driven by the stepping-mechanism-moved wiper until the latter reaches the interruption in the second track and therefore stops its drive. In this embodiment the programme means is stepped by a self-interrupting stepping mechanism. An important feature is that three associated tracks can be produced in a single manufacturing step and that no adjustment is necessary. The tracks are so mounted that one track thereof is simultaneously scanned by two wiper contacts. The interruptions in the tracks are associated with one another so that no adjustment is necessary. The timer-operated wiper contact is returned by the overrun coupling to its initial position, so that upon completion of the step the stepping-switch-mechanism operated wiper contact has moved the other, timer-operated wiper contact to the initial position.

According to another feature, which helps to simplify manufacture, the three tracks are disposed concentrically in the following arrangement: the first one (closed annulus) is the innermost and the third one (individual segments) is the outermost. This concentric arrangement of the tracks around an axis affords a compact construction. Depending upon the shape of the appliance, the tracks can, however, have other shapes and can be, for instance, elongated. The three tracks can be made as a printed circuit, in which case the interruption in the second track is advantageously formed as a recess, to reduce arcing at the edge of the contact.

Another step which simplifies manufacture is that the wiper contact which bridges the first and second tracks is moved by the drive for the stepping mechanism and programme member. This provision also reduces adjustment, since the association between the stepping movement and the position of the wiper contact on the tracks always remains constant. By electrically connecting the segments of the third track to contacts operated upon by the programme means, more accurate operation and reduced adjustment is obtained. Conveniently, the overrun coupling takes the form of a pawl which locks in one direction and which engages in a recess in a member mechanically connected to the stepping-mechanism-moved wiper contact, the pawl being mechanically connected to the timer-moved wiper contact. For the stepping mechanism-operated contact to move the timer moved wiper contact, a slipping coupling is provided between the timer drive and the wiper contact which interconnects the second and third tracks. Consequently, the timer-moved wiper contact, which always scans its two tracks uniformly, is carried along by the faster-moving stepping-mechanism-operated wiper contact. A slipping coupling ensures that the timer-moved wiper contact can be carried along by the timer drive which continues to operate. Upon reaching its initial position, the stepping-switch-operated wiper contact stops automatically because the pawl of the overrun coupling disengages from the member connected to the last-mentioned wiper contact. The cycle can be repeated any number of times without any danger of incorrect switching or other effects which upset reliability.

In an alternative form, the tracks can take the form of cams, in which case electrical traversing is replaced by mechanical scanning in conjunction with the use of contact sets and switch cams.

Features and advantages of the invention will also appear from the following description of one embodiment thereof, given by way of example, in conjunction with the accompanying drawings, in which:

FIGURE 1 is a diagrammatic plan view and circuit arrangement showing a device with the contact tracks and their co-operating wipers;

FIGURE 2 is a side view of the contact tracks and their co-operating wipers, and FIGURE 3 is a diagrammatic view of an overrun coupling on a reduced scale.

The device shown in FIGURES 1 and 2 comprises a base member 50, consisting of a plate or the like of insulating material upon the surface of which are disposed in a series of tracks a plurality of contact segments with terminal tabs; conveniently these are formed by a so-called printed circuit technique. The innermost track 1 is formed as a closed circular annulus, with a terminal tab 2; this track is surrounded by a further annular but interrupted track 3, with a terminal tab 51. To avoid arcing and tracking at the adjacent ends of this track it is convenient for the interruption 4 to be recessed. A bridging wiper contact 5, for connecting the contact tracks 1 and 3 is mounted for movement concentric with the tracks by means of a support arm or, as shown, by a disc 6 secured to a rotatable driving shaft 7.

What may be considered a third track, having an effective radius marked at 8, is provided by a series of segmental contacts indicated at 9, 10, 11 and 29; these are also formed as printed circuit elements, with terminal tabs 52, 53, 54, 55 respectively. A bridging wiper contact 12 is arranged to make connection between contact track 3 to a selected one of the segmental contacts 9, 10, 11 or 29. Contact 12 is carried by a disc 13 secured to a sleeve 32 freely rotatable on shaft 7; a gear 47 is secured to sleeve 32, and is driven from a constantly running uniform speed motor 30. A gear 56 on the motor shaft engages a gear 14, and in turn gear 14 drives gear 47 through a slipping clutch 31.

A motor 17 drives a gear 57 which meshes with a gear 46 secured to the shaft 7. This motor is energised from supply terminals 15, 16 in the manner indicated in FIGURE 1 over a circuit which includes terminal tabs 51 and 2.

The discs 6 and 13 are thus independently driven, an overrun clutching arrangement is provided between them; a suitable form of such a device is indicated in FIGURE 3. As shown, disc 13 carries a trailing, pivoted, spring-loaded pawl 26 which engages the edge of disc 6. Disc 6 has a detent 40 in its edge and the arrangement is such that if disc 13 is driven counterclockwise in the direction of arrow 28 disc 6 will not be driven, but if disc 6 is diven counterclockwise disc 13 will be driven by disc 6 when the pawl drops into the detent.

A programme selector is provided, comprising a series of contacts 18 to 21, and the contacts are arranged to be operated in sequence in response to the motion of a programme means 33. The programme contacts can be of any suitable kind, but can conveniently consist of switch contacts operated by cams on a rotatory cam member. The programme means 33 is driven for example by gear 57 engaging a gear on the periphery of member 33, from motor 17.

Of the contacts of the programme selector, some, such as 18, 19, 20, 21, are connected to segment contacts, such as 11, 10, 9, 29, respectively, while others not shown are operated at the corresponding positions of the cam member 33, perform the functions such as actuation of the water inlet valve, control of the heater, washing and spin drying and so on. In effect therefore, the cam member controls the function to be performed, and the dwell of the cam member at each position and hence the duration of that function, is controlled by the device shown in FIGURES 1 and 2. Since motor 30 is a constant speed motor, this device acts as a timing mechanism, and the timer intervals are determined by the position of the contacts 9, 10, 11, etc. Thus, the intervals between successive movements of the cam member 33 (and the duration of the functions) is timed by the device shown in FIGURES 1 and 2, in response to selection of the appropriate contacts 18, 19, etc.

The operation of the device is as follows:

With the parts in the position shown, the motor 17 is energised over a circuit from terminal 15, tab 51, contact track 3, wiper 5, track 1, tab 2, winding 17 to terminal 16. The motor 17 runs and drives the programme means 33 and shaft 7.

When the motor 17 runs the contact 5 moves in the direction indicated by an arrow 28 and at the same time the programme member 33 rotates. Upon rotation of wiper 5 and disc 6, the steep edge of recess 41 will engage pawl 40 of coupling 26 thus coupling disc 13 to disc 6 for being driven in common by motor 17 in the direction indicated by the arrow 28. Thus, when the motor 17 moves the wiper contact 5 in the direction indicated by the arrow 28, the motor 17 also acts as the drive for wiper 12. When contact 5 reaches the position 25 shown in dotted lines, the motor 17 is switched off, since the contact 5 is then at recess 4 thus interrupting the circuit to the motor 17. The shaft 7 stops and the step has therefore been completed, since the programme device 33 also stops. When motor 17 and hence disc 6 has stopped, pawl 40 can move out of engagement with recess 41, and disc 13 then continues to rotate unimpaired by disc 6, and being driven again by constant speed motor 30 through clutch 31.

Since the wiper contact 12 is moved at a uniform speed by motor 30, the distance travelled by the wiper 12 is a measure of time; the arrangement comprising the motor 30, corresponding transmissions and wiper 12 is therefore a timer. The stepping mechanism is formed by the motor 17, contact 5 and corresponding transmissions and couplings. The initial position of the wiper 12 at 27 is shown in dotted lines in FIGURE 1. The time taken by the wiper contact 12 to move from this momentarily occupied position 27 into engagement with the various segments contacts 29, 9, 10, 11 produces different time intervals between the steps of the programme device 33. Depending upon which of the contacts 18–21 is closed, a potential is applied to the corresponding segment. The time taken by the wiper contact 12 to pass from the position 27 to the energized segment 10 is the time in which one particular programme step follows another one. In FIGURE 1, the selector contact 19 is shown closed, such contact being disposed on the programme device 33 in this embodiment; however, the contact 19 can be operated separately, for instance, by a switch which responds to a physical quantity such as temperature. When the wiper 12 reaches the actual position shown in FIGURE 1, the supply terminal 15 is connected to the motor 17 by way of the second track 3, wiper contact 12, segment 10 and contact 19. The wiper contact 12 therefore starts the motor 17 and is kept running by wiper 5, which is mechanically connected to the disc 6, in the direction indicated by arrow 28. The solid-line position of the wiper 5 as shown in FIGURE 1 is, therefore, the instantaneous position in which the contact 12 of the timer has started the driving motor 17 of the stepping mechanism and thereafter motor 17 maintains its own energizing circuit through the contact 5 so that the motor circuit is maintained independently of wiper 12. The operation is then as described, that is the disc 6 with wiper contact 5 moves the disc 13 with wiper contact 12 with it and the cycle starts again. If none of the selector contacts 18–21 is in the closed state, the intervals between the various steps are much longer. The slipping clutch 31 is provided in order that the contact 12 can be moved against the force of the driving motor 30, which would move the contact 12 more slowly.

Any desired number of segments can be provided in place of the four segments 29, 9–11 shown; similarly, as many selector contacts 18–21 can be provided as required. The transmission systems between the motors 17, 30 and the respective shaft 7 and gear 14 can be of any kind. The two drives 17, 30 can be combined, for instance, by means of a motor which has a shiftable armature and thus has two switching positions. Also, the overrun coupling can be of some other form.

The invention can be used generally where it is required for a timer especially one of the printed circuit type to start a self-interrupting type stepping mechanism.

I claim:

1. A timer operated stepping device, comprising: a first annular scannable track; a second scannable track parallel thereto having an interruption; a third scannable track including a plurality of individual parts annularly arranged, angularly spaced apart and on a line parallel to said first and second tracks; first means for simultaneously scanning said first and second tracks including contact means defining a contact open position when on the interruption of said second track; second means for simultaneously scanning said third track and one of said first and second tracks and including contact means defining a contact open position when on one of the spaces between said individual parts of said third track; first electric means for driving said first scanning means; second electric means for driving said second scanning means, at a speed slower than said first scanning means is driven by said first driving means; electric circuit means for defining a first energizing circuit for said first driving means including said first contact means when said first scanning means is off said interruption; electric circuit for said first driving means, including said second contact means when closed; and coupling means mechanically interconnecting said two scanning means and permitting said two scanning means to be driven in common by said first driving means whenever the latter is energized through any of said circuit means, thereby disengaging said second scanning means from said second driving means.

2. A timer operated stepping device, comprising: a first annular scannable track; a second scannable track parallel thereto having an interruption; a third scannable track including a plurality of individual parts annularly arranged, angularly spaced apart and on a line parallel to said first and second track; first means for simultaneously scanning said first and second tracks including contact means defining a contact open position when on the interruption of said second track; second means for simultaneously scanning said third track and one of said first and second tracks and including contact means defining a contact open position when on one of the spaces between said individual parts of said third track; first electric means for driving said first scanning means; second electric means for driving said second scanning means at a constant rate, and slower than said first scanning means is driven by said first driving means; electric circuit means including said contact means of said first scanning means for defining a first energizing circuit for said first driving means; a plurality of program contacts selectively operated upon by said first driving means; second electric circuit means including said contact means of said second scanning means and said selectively operated contacts for defining a plurality of individual energizing circuits for said first driving means; and coupling means mechanically interconnecting said two scanning means and permitting said two scanning means to be driven in common by said first driving means whenever the latter is energized through any of said circuit means, thereby disengaging said second scanning means from said second driving means.

3. A timer operated stepping device, comprising: a supporting electrically insulating member; a first annular contact segment on said member; a second annular contact segment on said member coaxial with and adjacent to said annulus, one of said segments having an interruption; a plurality of third contact segments coxially arranged on a common track coaxial with and adjacent to said second segment; a first wiper contact for scanning and interconnecting said first and second segment; electric driving means for driving said first wiper contact; electric circuit means for completing an energizing circuit for said first driving means and including said first and second segments and said first wiper contact; a second wiper contact mounted for successively interconnecting said second contact segment with any of said third segments; second driving means for driving said second wiper contact at a constant rate and slower than said first wiper contact is driven by said first driving means; circuit means for completing a second energizing circuit for said motor and including said second contact segments, said second wiper contact and any of said third contact segments; and coupling means mechanically and releasably interconnecting said two wiper contacts for being driven in common by said first driving means whenever energized, said second wiper contact being disengaged from said second driving means whenever said coupling means has said two wiper contacts interconnected.

4. A timer operated stepping device, comprising: a supporting electrically insulating plate; a first annularly shaped contact segment on said plate; a second contact segment on said plate concentrical to said first segment and having a larger diameter than said first annular segment, said second segment having an interruption; a plurality of third contact segments on said plate disposed along a circle about said second segment; a first wiper contact for scanning and interconnecting said first and second segments; electric driving means for driving said first wiper contact; electric circuit means for completing an energizing circuit for said first driving means and including said first and second segments and said first wiper contact; a second wiper contact mounted for successively interconnecting said second contact segment with any of said third segments; second driving means for driving said second wiper contact at a constant rate and slower than said first wiper contact is driven by said first driving means; circuit means for completing a second energizing circuit for said motor and including said second contact segments, said second wiper contact and any of said third segments; and coupling means mechanically and releasably interconnecting said two wiper contacts for being driven in common by said first driving means whenever energized, said second wiper contact being disengaged from said second driving means whenever said coupling means has said two wiper contacts interconnected.

5. A device in accordance with claim 4 wherein the contact segments are formed as a printed circuit and the interruption on the second segment includes a recess in said plate.

6. A timer operated stepping device, comprising: an insulating plate; a first annular contact segment on said plate; an electric motor having one terminal connected to said contact segment; a second annular contact segment concentrical to said first contact segment, one of said segments having an interruption; a voltage source connected to another motor terminal and to said second contact segment; a third and a fourth contact segment concentrically arranged around said second segment and being angularly displaced from said interruption; two contacts individually connecting said third and fourth contact segments to said first motor terminal; a first rotatable wiper contact for interconnecting said first and second segment, and being drivingly connected to said motor; a second rotatable wiper contact for sequentially connecting said second contact segment to said third and fourth contact segments; means operated upon by said motor for selectively closing any of said two contacts, thereby connecting the respective contact segment to said first terminal; means for driving said second wiper contact at a slower rate than said first wiper contact is driven by said motor; means for positively and releasably interconnecting drivingly said two wiper contacts; and means for disengaging said second wiper contact from said driving means when said two wiper contacts are drivingly interconnected.

7. A timer operated stepping device, comprising: a first scannable track; a second scannable track parallel thereto having an interruption; a third scannable track including a plurality of individual parts arranged spaced apart and on a line parallel to said first and second tracks; first means for simultaneously scanning said first and second tracks including contact means defining a contact open position when on the interruption of said second track; second means for simultaneously scanning said third track and one of said first and second tracks and including contact means defining a contact open position when on one of the spaces between said individual parts of said third track; first electric means for driving said first scanning means; a disc with a recess also driven by said first driving means; second electric means for driving said second scanning means, at a speed slower than said first scanning means is driven by said first driving means; a pivotable pawl connected to said second scanning means capable of engaging said disc in said recess thereof, said first driving means when energized driving also said second scanning means through said disc and said pawl; electric circuit means for defining a first energizing circuit for said first driving means including said first contact means when said first scanning means is off said interruption; electric circuit means for defining a second energizing circuit for said first driving means, including said second contact means; and means for disengaging said second driving means from said second scanning means whenever the latter is being driven by said first driving means through said disc and pawl.

References Cited by the Examiner

UNITED STATES PATENTS

| | | | |
|---|---|---|---|
| 2,281,888 | 5/42 | Snyder | 200—37 |
| 2,707,731 | 5/55 | Backus | 200—37 |
| 2,982,824 | 5/61 | Forrest | 200—11 |

LLOYD McCOLLUM, *Primary Examiner.*

WALTER STOLWEIN, *Examiner.*